United States Patent
Cai et al.

(10) Patent No.: US 8,953,684 B2
(45) Date of Patent: Feb. 10, 2015

(54) MULTIVIEW CODING WITH GEOMETRY-BASED DISPARITY PREDICTION

(75) Inventors: Hua Cai, Beijing (CN); Jian-Guang Lou, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1669 days.

(21) Appl. No.: 11/803,972

(22) Filed: May 16, 2007

(65) Prior Publication Data

US 2008/0285654 A1  Nov. 20, 2008

(51) Int. Cl.
  *H04N 11/04*  (2006.01)
  *H04N 19/61*  (2014.01)
  *H04N 19/597*  (2014.01)

(52) U.S. Cl.
  CPC ........... *H04N 7/50* (2013.01); *H04N 19/00769* (2013.01)
  USPC .................................................... 375/240.16

(58) Field of Classification Search
  CPC .... H04N 5/145; H04N 7/26244; H04N 7/508
  USPC ..................................................... 375/240.16
  See application file for complete search history.

(56) References Cited

U.S. PATENT DOCUMENTS

| | | | |
|---|---|---|---|
| 5,764,236 A | 6/1998 | Tanaka et al. | |
| 6,055,012 A | 4/2000 | Haskell et al. | |
| 6,198,852 B1 * | 3/2001 | Anandan et al. | 382/284 |
| 6,999,513 B2 | 2/2006 | Sohn et al. | |
| 7,623,733 B2 * | 11/2009 | Hirosawa | 382/284 |
| 7,778,328 B2 * | 8/2010 | Vedula et al. | 375/240.12 |
| 7,804,898 B2 * | 9/2010 | Auberger et al. | 375/240.1 |
| 2004/0240859 A1 | 12/2004 | Karimoto et al. | |
| 2005/0031035 A1 | 2/2005 | Vedula et al. | |
| 2005/0117019 A1 | 6/2005 | Lamboray et al. | |
| 2006/0023073 A1 | 2/2006 | Li et al. | |
| 2006/0119601 A1 * | 6/2006 | Finlayson et al. | 345/427 |

(Continued)

FOREIGN PATENT DOCUMENTS

WO   WO2006041261 A1   4/2006

OTHER PUBLICATIONS

International Search Report and Written Opinion Received for PCT Application No. PCT/US2008/063807, mailed on Oct. 8, 2008, 10 pages.

(Continued)

*Primary Examiner* — Aravind Moorthy
(74) *Attorney, Agent, or Firm* — Miia Sula; Judy Yee; Micky Minhas

(57) ABSTRACT

Described herein is technology for, among other things, multiview coding with geometry-based disparity prediction. The geometry-based disparity prediction involves determining corresponding block pairs in a number of reconstructed images for an image being coded. The reconstructed images and the image represent different views of a scene at a point in time. Each corresponding block pair is projected on the image. This enables determination of disparity vector candidates. For each coding block of the image, a predicted disparity vector is determined based on the disparity vector candidates. Then, the predicted disparity vector may be utilized to obtain the bits to be encoded. The geometry-based disparity prediction reduces the number of encoded bits.

20 Claims, 13 Drawing Sheets

(56) References Cited

U.S. PATENT DOCUMENTS

| | | | |
|---|---|---|---|
| 2006/0153289 A1 | 7/2006 | Choi et al. | |
| 2006/0176520 A1* | 8/2006 | Motomura et al. | 358/451 |
| 2006/0222079 A1 | 10/2006 | Park et al. | |
| 2006/0232666 A1 | 10/2006 | Op De Beeck et al. | |
| 2009/0168874 A1* | 7/2009 | Su et al. | 375/240.12 |

OTHER PUBLICATIONS

Li-Fu Ding, et al. "Stereo Video System with Hybrid Based on Joint Prediction Scheme", ISCAS, 2005. IEEE International Symposium on Circuits and Systems, May 23-26, 2005, IEEE, vol. 3, pp. 2092-2095.

Ellinas, et al., "Stereo Image Coder Based on the MRF Model for Disparity Compensation", http://www.hindawi.com/GetArticle.aspx?doi=10.1155/ASP/2006/73950&e=ref.

Shukla, et al., "Disparity Dependent Segmentation Based Stereo Image Coding", http://www.egr.msu.edu/waves/people/Radha_files/2003/ICIP03_1.pdf.

Woo Woontack, "Rate-Distortion Based Dependent Coding for Stereo Images and Video: Disparity Estimation and Dependent Bit Allocation", Date: Dec. 1998, http://vr.kjist.ac.kr/~Publications/PhDThesis_Woo.pdf.

Lou et al., "A Real-Time Interactive Multiview Video System", Proceedings of the 13th ACM International Conference on Multimedia (ACMMM 2005), Singapore, Nov. 2005, pp. 161-170.

"Dinosaur Sequence from University of Hannover [Online]", Available at http://www.robots.ox.ac.uk/~vgg/data.html, 2007.

"JM Reference Software Version 10.2" Available Online: http://iphome.hhi.de/suehring/tml/download/jm10.2.zip.

Torr et al., "Robust Computation and Parameterization of Multiple View Relations", Proceedings of the 6th International Conference on Computer Vision, IEEE, pp. 727-732, 1998.

Torr et al., "Robust Parameterization and Computation of the Trifocal Tensor", Image and Vision Computing, vol. 15, pp. 591-605, 1997.

Scharstein et al., "A Taxonomy and Evaluation of Dense Two-Frame Stereo Correspondence Algorithms", International Journal of Computer Vision, vol. 47 No. 1-3, pp. 7-42, Jun. 2002.

"Advanced Video Coding for Generic Ausio-Visual Services", International Telecommunications, Union-Telecommunications and International Standards Organization/International Electrotech. Communications, Recommendation H.264 and ISO/IEC 14996-10 AVC, 2003.

Lu et al., "An Epipolar Geometry-Based Fast Disparity Estimation Algorithm for Multiview Image and Video Encoding", IEEE Transactions on Circuits and Systems for Video Technology, vol. 17 No. 6, pp. 737-750, Jun. 2007.

"Breakdancer Sequence", Available online: http://research.microsoft.com/vision/InteractiveVisualMediaGroup/3DVideoDownload/.

Zhang, Z., "Determining the Epipolar Geometry and Its Uncertainty: A Review", International Journal of Computer Vision, vol. 27 No. 2, pp. 161-195, Mar. 1998.

Woo et al., "Overlapped Block Disparity Compensation with Adaptive Windows for Stereo Image Coding", IEEE Transactions on Circuits and Systems for Video Technology, vol. 10 No. 2, pp. 194-200, Mar. 2000.

Chang et al., "Light Field Compression Using Disparity-Compensated Lifting and Shape Adaptation", IEEE Transactions on Image Processing, vol. 15 No. 4, pp. 793-806, Apr. 2006.

"Joint Final Committee Draft (JFCD) of Joint Video Specification (ITU-T Rec. H.264 | ISO/IEC 14496-10 AVC)", Draft ISO/IEC 14496-10, Klagenfurt, Austria, Jul. 22-26, 2002.

Martinian et al., "Extensions of H.264/AVC for Multiview Video Compression", Proceedings of the IEEE International Conference on Image Processing, pp. 2981-2984, Oct. 8-11, 2006.

"House Sequence", Available online: http://www.robots.ox.ac.uk/~vgg/data.html.

Hartley et al., "Multiple View Geometry in Computer Vision", Cambridge, United Kingdom, Cambridge University Press, 2000.

Spetsakis et al., "Structure from Motion Using Line Correspondences", International journal of Computer Vision, vol. 4 No. 3, pp. 171-183, 1990.

Zitnick et al., "High-Quality Video View Interpolation Using a Layered Representation", International Conference on Computer Graphics and Interactive Techniques, ACM, SIGGRAPH, pp. 600-608, 2004.

Chen et al., "View Interpolation for Image Synthesis", Proceedings of the 20th Annual Conference on Computer Techniques, pp. 279-288, Anaheim, CA, Aug. 2-6, 1993.

Magnor et al., "Multiview Coding for Image-Based Rendering Using 3-D Scene Geometry", IEEE Transactions on Circuits and Systems for Video Technology, vol. 13 No. 11, pp. 1092-1106, Nov. 2003.

San et al., "Mulitview Image Coding Based on Geometric Prediction", IEEE Transactions on Circuits and Systems for Video Technology, vol. 17 No. 11, pp. 1536-1549, Nov. 2007.

"Ballroom Sequence" Available Online: ftp://ftp.merl.com/pub/avetro/mvc-testseq.

J.-G. Lou, H. Cai, and J. Li, "A real-time interactive multiview video system," in Proc. 13th ACM Int. Conf. Multimedia (ACMMM 2005), Singapore, Nov. 2005, pp. 161-170.

Smolić et al., "3 DAV Exploration of Video-Based Rendering Technology in MPEG", IEEE Transactions on Circuits System Technologies, vol. 14 No. 3, Mar. 2004, pp. 98-110.

Smolić et al., "Interactive 3-D Video Representation and Coding Technologies" Proceedings of IEEE, Special issue on Advances in Video Coding and Delivery, vol. 93 No. 1, pp. 98-110, Jan. 2005.

Aydinoglu et al., "Stereo Image Coding: a Projection Approach," IEEE Transactions on Image Processing, vol. 7 No. 4, pp. 506-516, Apr. 1998.

Ouali et al, "A Cooperative Multiscale Phase-Based Disparity Algorithm", Proceedings of the International Conference on Image Processing, pp. 145-149, Kobe, Japan, Oct. 1999.

Li et al.,"Approach to H.264-Based Stereoscopic Video Coding", Proceedings of ICIG, Dec. 2004, pp. 365-368.

Yan et al., "Stereo Video Coding Based on Frame Estimation and Interpolation", IEEE Transactions on Brodcasting, vol. 49 No. 1, pp. 14-21, Mar. 2003.

Li et al.,e"A Novel Multiview Video Coding Scheme Based on H.264", Proceedings of ICICS, vol. 1, pp. 493-497, Dec. 2003.

Tong et al.,"Coding of Multiview Images for Immersive Viewing", Proceedings of the IEEE International Conference on Acoustic Speech Signal Processing, vol. 4, pp. 1879-1882, Istanbul, Turkey, Jun. 2000.

Aydinoglu et al., "Stereo Image Coding", Proceedings of the IEEE International Symposium on Circuits Systems, vol. I, pp. 247-250, Apr. 1995.

Aydinoglu et al., "Compression of Multiview Images", Proceedings of the International Conference on Image Processing, vol. 2, pp. 385-389, Nov. 13-16, 1994.

Duarte et al., "Mulitscale Recurrent Patterns Applied to Stereo Image Coding" IEEE Transactions on Circuits System Video Technologies, vol. 15 No. 11, pp. 1434-1447, Nov. 2005.

* cited by examiner

800

```
for each corresponding block pair, calculate 3D coordinates
corresponding to the scene

810
```

```
for each corresponding block pair, calculate a projection position on
the current coding image of the 3D coordinates

820
```

```
for each corresponding block pair, calculate an offset between the
projection position and a corresponding block pair position in the
first reconstructed image

MULTIVIEW CODING WITH GEOMETRY-BASED DISPARITY PREDICTION

BACKGROUND

Advances in technology have ushered in various new user visual experiences based on captured video and/or captured images of a real world 3D (three-dimensional) scene, which may be static or dynamic. Some of these new user visual experiences are based on the concept of multiview. Multiview refers to the notion of enabling the user to watch the same scene from different viewing angles or perspectives. Movies, television broadcasting, home entertainment, sports venues, education, advertising, and real estate listings are some examples of areas that have employed multiview technology.

Multiview video, including freeview video, and multiview images are some examples of multiview technologies. In general, multiview video represents multiple video streams from synchronized video capture devices at different positions with respect to the captured scene. Similarly, a multiview image represents multiple image streams from synchronized image capture devices at different positions with respected to the captured scene. These video capture devices and image capture devices may be any one of numerous camera types.

Many techniques have been crafted or proposed to provide a multiview visual experience to the user that rivals the quality of single view technologies. Some of these techniques utilize existing solutions. Others utilize newly developed solutions. Still, others focus on using a hybrid solution. Different factors guide real world implementations of these techniques. However, each of these solutions has to be able to deal with the enormous amount of multiview data compare to single view data for a given application.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, multiview coding with geometry-based disparity prediction. The geometry-based disparity prediction involves determining corresponding block pairs in a number of reconstructed images for an image being coded. The reconstructed images and the image represent different views of a scene at a point in time. Each corresponding block pair is projected on the image. This enables determination of disparity vector candidates. For each coding block of the image, a predicted disparity vector is determined based on the disparity vector candidates. Then, the predicted disparity vector may be utilized to obtain the bits to be encoded. The geometry-based disparity prediction reduces the number of encoded bits.

Thus, embodiments allow for greater compression when performing multiview coding. Embodiments reduce memory storage requirements for multiview data and reduce bandwidth requirements for transmitting multiview data. As result, real world applications of multiview data are more feasible and practical.

BRIEF DESCRIPTION OF THE DRAWINGS

The accompanying drawings, which are incorporated in and form a part of this specification, illustrate various embodiments and, together with the description, serve to explain the principles of the various embodiments.

FIG. 8 illustrates a flowchart for projecting corresponding block pairs to a coding image to determine disparity vector candidates, in accordance with various embodiments.

DETAILED DESCRIPTION

Reference will now be made in detail to the preferred embodiments, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the claims. Furthermore, in the detailed description, numerous specific details are set forth in order to provide a thorough understanding of the disclosure. However, it will be obvious to one of ordinary skill in the art that the disclosure may be practiced without these specific details. In other instances, well known methods, procedures, components, and circuits have not been described in detail as not to unnecessarily obscure aspects of the disclosure.

Overview

Multiview data (e.g., multiview video and multiview images) significantly increase the number of bits that undergo encoding and decoding. Described herein is technology for, among other things, multiview coding with geometry-based disparity prediction. Geometric relations among different views of a scene are independent of the scene structure. These geometric relations depend on parameters associated with the capture device (e.g., camera). As a result, these parameters may be computed independently of the multiview coding and do not need to undergo encoding/decoding.

The geometry-based disparity prediction involves determining corresponding block pairs in a number of reconstructed images for an image being coded. The reconstructed images and the image represent different views of a scene at a point in time. Each corresponding block pair is projected on the image. This enables determination of disparity vector candidates. For each coding block of the image, a predicted disparity vector is determined based on the disparity vector candidates. Then, the predicted disparity vector may be utilized to obtain the bits to be encoded. The geometry-based disparity prediction reduces the number of encoded bits.

As a result, greater compression of multiview data is achieved. Further, there are reductions in memory storage requirements for the multiview data and reductions in bandwidth requirements for transmitting the multiview data, making real world applications of multiview data more feasible and practical.

The following discussion will begin with a description of an example operating environment for various embodiments. Discussion will proceed to a description of a geometry-based disparity predictor. Discussion will then proceed to descriptions of multiview coding techniques using geometry-based disparity prediction.

Example Operating Environment

Figure 1:
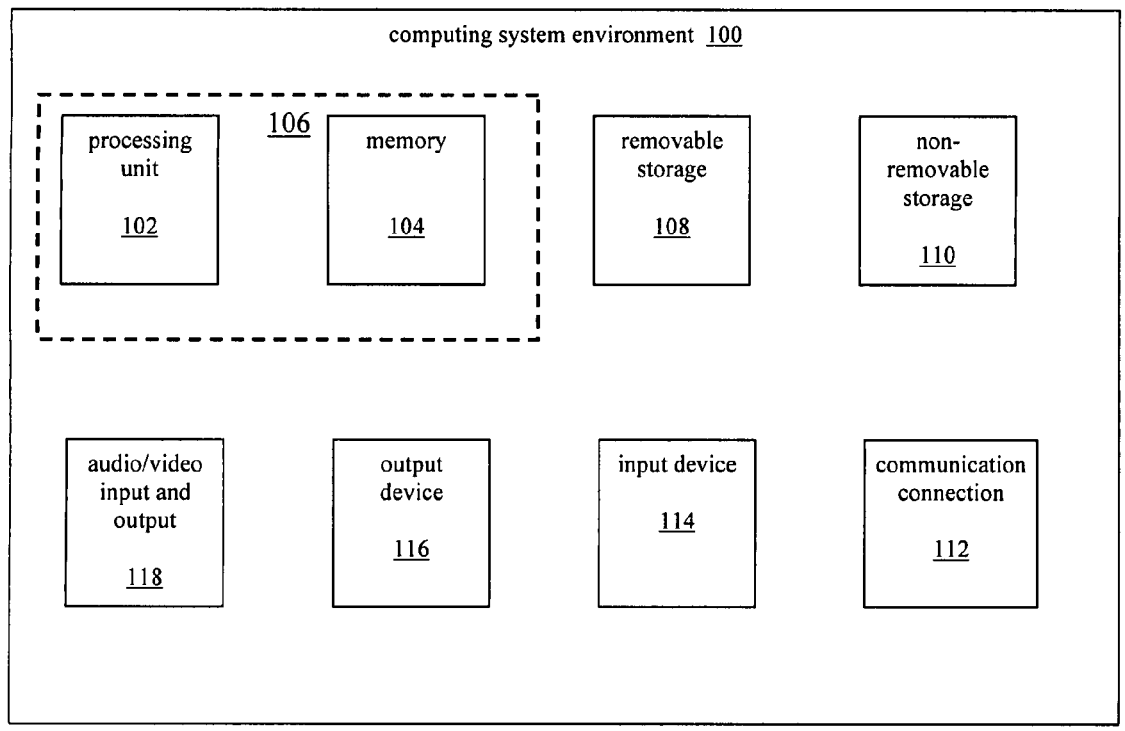
FIG. 1 is a block diagram of an exemplary computing system environment for implementing embodiments.

With reference to FIG. 1, an exemplary system for implementing embodiments includes a general purpose computing system environment, such as computing system environment 100. In various embodiments, the computing system environment 100 may be a standalone coding device such as an encoder, a decoder, and an encoder/decoder. Also, the computing system environment 100 may be a system having a coding device. In its most basic configuration, computing system environment 100 typically includes at least one processing unit 102 and memory 104. Depending on the configuration and type of computing system environment 100, memory 104 may be volatile (such as RAM), non-volatile (such as ROM, flash memory, etc.) or some combination of the two. This most basic configuration is illustrated in FIG. 1 by dashed line 106. Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 100 may also have input device(s) 114 such as a keyboard, mouse, pen, voice input device, touch input device, remote control input device, etc. Output device(s) 116 such as a display, speakers, printer, etc. may also be included. All these devices are well known in the art and need not be discussed at length here.

The computing system environment 100 may also include a number of audio/video inputs and outputs 118 for receiving and transmitting video content. These inputs and outputs may include, but are not limited to, coaxial, composite video, S-video, HDMI, DVI, VGA, component video, optical, and the like. It should be appreciated that since video content may be delivered over an Internet connection, a network interface may therefore also be considered an A/V input on which video content is received.

Embodiments are described in terms of these example environments. Description in these terms is provided for convenience only. It is not intended that the embodiments be limited to application in this example environment. In fact, after reading the following description, it will become apparent to a person skilled in the relevant art how to implement alternative embodiments.

Geometry-Based Disparity Predictor

Multiview data, such as multiview video and multiview images, may be compressed by various coding schemes. A multiview coding scheme focuses on reducing the redundancy of multiview data captured by synchronized video/image capture devices (e.g., camera) at different positions with respect to the captured scene. For example, there is redundancy in video images or still images captured from different viewpoints (or views) at the same time. This inter-viewpoint redundancy may be minimized by inter-viewpoint disparity compensation.

Inter-viewpoint disparity compensation involves determining disparity vectors. A disparity vector represents a vector distance between two points on superimposed video images or still images from different viewpoints that correspond to the same scene point in the real world 3D scene. Due to numerous factors, it is more convenient to predict the disparity vectors using a disparity predictor. Then, the disparity vectors are derived from the predicted disparity vector to enable inter-viewpoint disparity compensation.

Figure 2A:
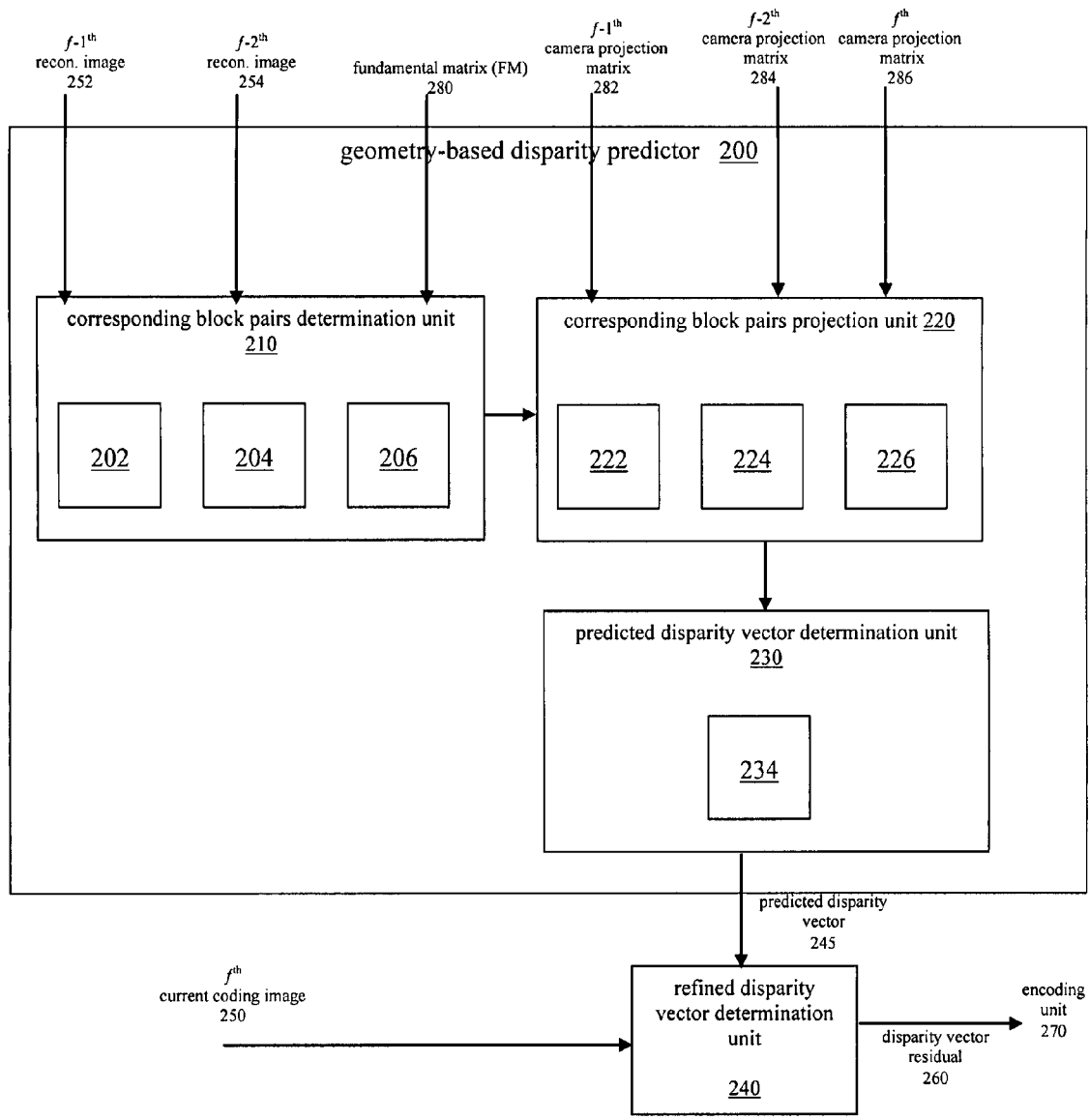
FIG. 2A illustrates a block diagram of a geometry-based disparity predictor in an encoding environment, in accordance with various embodiments.
Figure 2B:
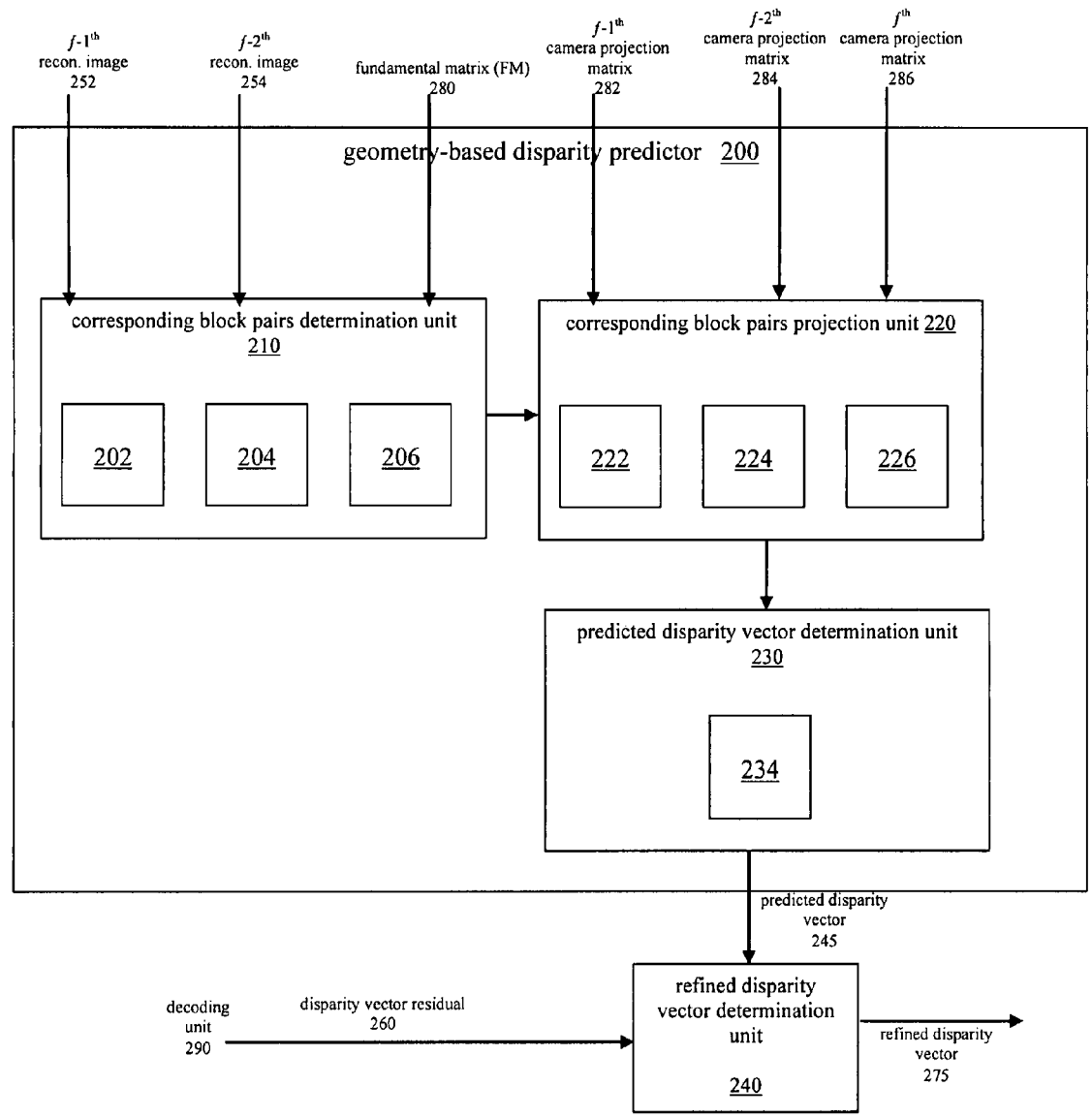
FIG. 2B illustrates a block diagram of a geometry-based disparity predictor in a decoding environment, in accordance with various embodiments.

FIG. 2A illustrates a block diagram of a geometry-based disparity predictor 200 in an encoding environment 290A, in accordance with various embodiments. FIG. 2B illustrates a block diagram of a geometry-based disparity predictor 200 in a decoding environment 290B, in accordance with various embodiments.

Figure 3:
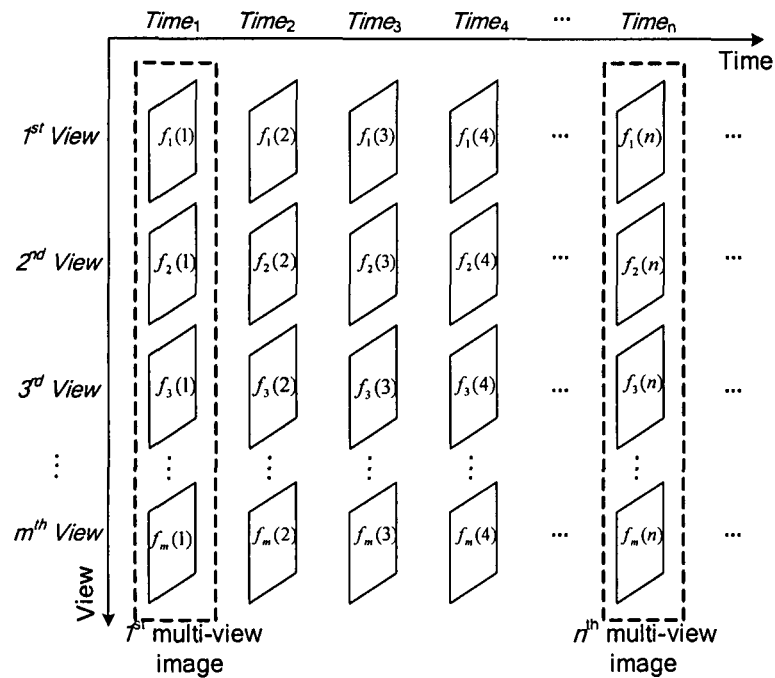
FIG. 3 illustrates multiview data, in accordance with various embodiments.

Before describing in detail the geometry-based disparity predictor 200 of FIG. 2A and FIG. 2B, multiview data will be introduced by referring to FIG. 3, which illustrates multiview data 300, in accordance with various embodiments. It should be understood that multiview data 300 may be multiview video, multiview images, or any other multiview data type.

As depicted in FIG. 3, the horizontal axis represents TIME while the vertical axis represents VIEWPOINT. The multiview data 300 may represent multiview video or multiview images, depending on whether video or still images are captured from the different viewpoints. If video is being captured, the multiview data 300 may be multiview video, which may include m video streams captured from m viewpoints. The notation $f_i(j)$ may denote the $j^{th}$ video frame (or video image) of the $i^{th}$ view (or viewpoint). Each view may correspond to a separate video capturing device (e.g., video camera) at different positions with respected to the captured scene. A scene refers to a real world 3D (three-dimensional) scene. If still images are being captured, the multiview data 300 may be multiview images, where each multiview image may include m still images captured from m viewpoints at a point in time. The $1^{st}$ multiview image and the $n^{th}$ multiview image are shown by broken line in FIG. 3. Further, the multiview video may be considered to be a sequence of multiview images.

Referring again to FIG. 2A, a block diagram of a geometry-based disparity predictor 200 in an encoding environment 290A is illustrated, in accordance with various embodiments. As seen in FIG. 2A, the geometry-based disparity predictor 200 generates predicted disparity vector(s) 245, which is/are utilized as described above with respect to inter-viewpoint disparity compensation. As will be described in detail below, geometric relations among different views of a scene are independent of the scene structure. These geometric relations depend on parameters associated with the capture device (e.g., video camera, still image camera, etc.). As a result, the geometry-based disparity predictor 200 uses various camera projection matrices 282, 284 and 286 representing parameters of the respective camera. Each camera projection matrix may be determined by a camera's intrinsic parameters (e.g., focal length) and its posture in the real world 3D (three-dimensional) space. Also, the fundamental matrix (FM) 280, which may be derived from camera projection matrices, is utilized. The camera projection matrices 282, 284 and 286 and the FM 280 may be computed independently of the geometry-based disparity predictor 200 through camera calibration.

Continuing with FIG. 2A, the notations $f-2^{th}$, $f-1^{th}$, and $f^{th}$ denote viewpoints and relative order of the viewpoints. For example, $f-1^{th}$ viewpoint is between $f-2^{th}$ viewpoint and $f^{th}$ viewpoint. In an embodiment, the geometry-based disparity predictor 200 generates the predicted disparity vector(s) 245 for a $f^{th}$ viewpoint image (e.g., video image and still image) 250 based on a $f-1^{th}$ viewpoint image and a $f-2^{th}$ viewpoint image. Moreover, the $f-1^{th}$ viewpoint image and the $f-2^{th}$ viewpoint image have already undergone processing and encoding. Thus, the $f-1^{th}$ viewpoint image and the $f-2^{th}$ viewpoint image are reconstructed before being used by the geometry-based disparity predictor 200. Overall, the $f^{th}$ viewpoint image 250, $f-1^{th}$ viewpoint reconstructed image 252, and $f-2^{th}$ viewpoint reconstructed image 254 represent different images of a scene at a certain time. That is, the geometry-based disparity predictor 200 operates on images (e.g., video image and still image) captured from different viewpoints (or views) at the same time.

Also, each of the $f^{th}$ viewpoint image 250, $f-1^{th}$ viewpoint reconstructed image 252, and $f-2^{th}$ viewpoint reconstructed image 254 has a corresponding camera projection matrix for the camera positioned at the corresponding viewpoint. These camera projection matrices are $f^{th}$ viewpoint camera projection matrix 282, $f-1^{th}$ viewpoint camera projection matrix 284, and $f-2^{th}$ viewpoint camera projection matrix 286.

As depicted in FIG. 2A, the geometry-based disparity predictor 200 may have a corresponding block pairs determination unit 210, a corresponding block pairs projection unit 220, and a predicted disparity vector determination unit 230, in accordance with various embodiments. These components may be implemented in hardware, software, or a combination thereof.

The corresponding block pairs determination unit 210 is operable to determine corresponding block pairs between $f-1^{th}$ viewpoint reconstructed image 252 and $f-2^{th}$ viewpoint reconstructed image 254. That is, a block of $f-1^{th}$ viewpoint reconstructed image 252 corresponds to a block of $f-2^{th}$ viewpoint reconstructed image 254 if each block provides an image of the same portion of a scene from different views. These blocks are referred to as corresponding block pairs. In an embodiment, each block of corresponding block pairs is identified by its centroid coordinates. In accordance with various embodiments, corresponding block pairs determination unit 210 may include a partition unit 202, an epipolar line calculation unit 204, and a block match search unit 206. In an embodiment, the partition unit 202 is operable to partition the $f-1^{th}$ viewpoint reconstructed image 252 into a plurality of partition blocks. In an embodiment, each partition block is identified by its centroid coordinates. Next, the epipolar line calculation unit 204 is operable to calculate an epipolar line in the $f-2^{th}$ viewpoint reconstructed image 254 for each partition block of the $f-1^{th}$ viewpoint reconstructed image 252, in an embodiment. A detailed discussion of operation of the epipolar line calculation unit 204 is now presented.

Figure 4:
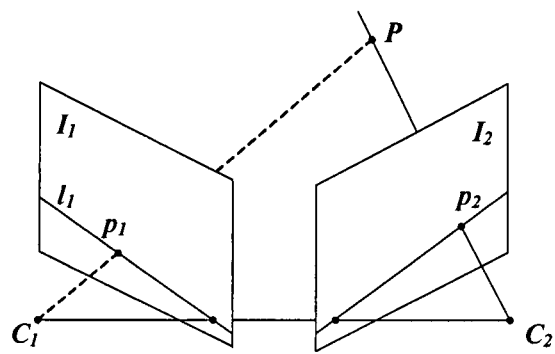
FIG. 4 illustrates multiview geometry, in accordance with various embodiments.

To describe operation of the epipolar line calculation unit 204, multiview geometry and the epipolar line will be discussed while referring to FIG. 4. Multiview geometry is illustrated in FIG. 4, in accordance with various embodiments. Images representing different views of a scene at an instance of time are not unrelated. Several geometric relationships exist between two, three, or more images, where these geometric relationships are the subject matter of multiview geometry. Epipolar geometry focuses on the geometric relationships of two images representing different views of a scene at an instance of time.

Still referring to FIG. 4, the images $I_1$ and $I_2$ are different views of a scene at an instance of time, where $C_1$ and $C_2$ are the optical centers of first and second cameras (e.g., video camera, still camera, etc.), respectively. The point P is in a scene's 3D (three-dimensional) space. The notation $P_2$ denotes the projection of point P on the image $I_2$. According to epipolar geometry, the corresponding point $P_1$ in the image $I_1$ of the point P is constrained to lie on line $l_1$. This line $l_1$ denotes the epipolar line of $P_2$. The epipolar constraint may be formulated as the equation (1):

$$\tilde{P}_1^T \cdot F \cdot \tilde{P}_2 = \tilde{P}_1^T \cdot l_1 = 0 \qquad (1)$$

The notations $\tilde{P}_1$ and $\tilde{P}_2$ denote the homogeneous coordinates of $P_1$ and $P_2$. The notation T denotes transpose of a matrix. Moreover, F denotes the fundamental matrix (FM), which was introduced above in FIG. 2A and FIG. 2B as FM 280. The FM is a 3×3 matrix, which is determined by the intrinsic matrix and the relative position of the first and second cameras. If first and second cameras are calibrated, both intrinsic and extrinsic camera parameters are known. The FM may be readily calculated from camera projective matrices of the first and second cameras, where camera projective matrices were introduced above in FIG. 2A and FIG. 2B as camera projection matrices 282, 284 and 286. Therefore, from the equation (1), since F and the centroid coordinates of the partition block of the f-1$^{th}$ viewpoint reconstructed image 252 are available, the epipolar line calculation unit 204 (FIG. 2A and FIG. 2B) may compute the equation of epipolar line $l_1$ in the f-2$^{th}$ viewpoint reconstructed image 254.

Continuing with FIG. 2A, the block match search unit 206 of the geometry-based disparity predictor 200 is operable to search for block matches between the partition blocks of the f-1$^{th}$ viewpoint reconstructed image 252 and blocks of the f-2$^{th}$ viewpoint reconstructed image 254 that satisfy a criterion to form corresponding block pairs, in an embodiment. The coordinates of the corresponding block pairs are noted. In an embodiment, each block of corresponding block pairs is identified by its centroid coordinates. In an embodiment, the criterion is a minimal mean-squared-error (MSE) criterion between the blocks. In an embodiment, the search is focused on a search window based on the epipolar line in the f-2$^{th}$ viewpoint reconstructed image 254. In an embodiment, a full search is performed on the f-2$^{th}$ viewpoint reconstructed image 254.

Returning to FIG. 2A, the corresponding block pairs projection unit 220 of the corresponding block pairs determination unit 210 is operable to project the corresponding block pairs to the f$^{th}$ viewpoint image 250, which is the image being encoded. This allows determination of disparity vector candidates, which may become predicted disparity vectors after further processing by the geometry-based disparity predictor 200. In accordance with various embodiments, the corresponding block pairs projection unit 220 may have a 3D coordinates calculation unit 222, a projection calculation unit 224, and a disparity vector candidates calculation unit 226. The 3D coordinates calculation unit 222 is operable to calculate each corresponding block pair's 3D coordinates in the real world scene, in an embodiment. A detailed discussion of operation of the 3D coordinates calculation unit 222 is now presented.

The projection of a point in a scene to a point in an image of a camera may be modeled by equation (2):

$$z \begin{bmatrix} u \\ v \\ 1 \end{bmatrix} = M \begin{bmatrix} x_P \\ y_P \\ z_P \\ 1 \end{bmatrix}, \quad (2)$$

The notation $[x_P\, y_P\, z_P\, 1]^T$ denotes the homogeneous coordinates of a 3D point P in a scene. Also, the notation $[u\, v\, 1]^T$ denotes the homogeneous coordinates of the projection of the point P to a point in the image while the notation z denotes point P's depth. The notation M denotes a camera projection matrix, as illustrated by camera projection matrices 282, 284 and 286 of FIG. 2A and FIG. 2B. The camera projection matrix, which is a 3×4 matrix, may be determined by the camera's intrinsic parameters (e.g. focal length) and its posture in the real world 3D (three-dimensional) space.

Now, the projection of a 3D point P in a scene to a point $P_1$ in a first image of a first camera and to a point $P_2$ in a second image of a second camera may be modeled by equation (3) and equation (4):

$$Z_{c1} \begin{bmatrix} u_1 \\ v_1 \\ 1 \end{bmatrix} = M_1 \begin{bmatrix} x_P \\ y_P \\ z_P \\ 1 \end{bmatrix} = \begin{bmatrix} m_{11}^1 & m_{12}^1 & m_{13}^1 & m_{14}^1 \\ m_{21}^1 & m_{22}^1 & m_{23}^1 & m_{24}^1 \\ m_{31}^1 & m_{32}^1 & m_{33}^1 & m_{34}^1 \end{bmatrix} \begin{bmatrix} x_P \\ y_P \\ z_P \\ 1 \end{bmatrix} \quad (3)$$

$$Z_{c2} \begin{bmatrix} u_2 \\ v_2 \\ 1 \end{bmatrix} = M_2 \begin{bmatrix} x_P \\ y_P \\ z_P \\ 1 \end{bmatrix} = \begin{bmatrix} m_{11}^2 & m_{12}^2 & m_{13}^2 & m_{14}^2 \\ m_{21}^2 & m_{22}^2 & m_{23}^2 & m_{24}^2 \\ m_{31}^2 & m_{32}^2 & m_{33}^2 & m_{34}^2 \end{bmatrix} \begin{bmatrix} x_P \\ y_P \\ z_P \\ 1 \end{bmatrix} \quad (4)$$

The notations $M_1$ and $M_2$ denote the camera projection matrices of first and second cameras. Since these camera projection matrices are known, they are entered into equation (3) and equation (4). Further, notations $(u_1, v_1, 1)$ and $(u_2, v_2, 1)$ denote the homogeneous coordinates of $P_1$ and $P_2$ in the respective images of the first and second cameras. The notation $[x_P\, y_P\, z_P\, 1]^T$ denotes the homogeneous coordinates of the 3D point P in the scene. Additionally, the notations $Z_{c1}$ and $Z_{c2}$ denote point P's depth with respect to the first and second images, respectively.

With elimination of $Z_{c1}$ and $Z_{c2}$ and entry of known camera projection matrices $M_1$ and $M_2$ (e.g., f-1$^{th}$ viewpoint camera projection matrix 284 and f-2$^{th}$ viewpoint camera projection matrix 286), the equations (3) and (4) are converted to the following equations (5) and (6), respectively:

$$(u_1 m_{31}^1 - m_{11}^1)x_P + (u_1 m_{32}^1 - m_{12}^1)y_P + (u_1 m_{33}^1 - m_{13}^1)z_P = m_{14}^1 - u_1 m_{34}^1$$

$$(v_1 m_{31}^1 - m_{21}^1)x_P + (v_1 m_{32}^1 - m_{22}^1)y_P + (v_1 m_{33}^1 - m_{23}^1)z_P = m_{24}^1 - v_1 m_{34}^1 \quad (5)$$

$$(u_2 m_{31}^2 - m_{11}^2)x_P + (u_2 m_{32}^2 - m_{12}^2)y_P + (u_2 m_{33}^2 - m_{13}^2)z_P = m_{14}^2 - u_2 m_{34}^2$$

$$(v_2 m_{31}^2 - m_{21}^2)x_P + (v_2 m_{32}^2 - m_{22}^2)y_P + (v_2 m_{33}^2 - m_{23}^2)z_P = m_{24}^2 - v_2 m_{34}^2 \quad (6)$$

Here, $[x_P\, y_P\, z_P\, 1]^T$ (the 3D spatial coordinates of P) is the solution of the above four linear equations. In an embodiment, if the two camera's projective matrices and the corresponding image points $P_1$ and $P_2$ are all known, a least-square method may be used to estimate the position of the 3D point P in a scene. In an embodiment, the 3D coordinates calculation unit 222 utilizes equations (5) and (6) and centroid coordinates of corresponding block pairs to calculate each corresponding block pair's 3D coordinates in the real world scene.

Again referring to FIG. 2A, the projection calculation unit 224 of the corresponding block pairs projection unit 220 is operable to calculate a projection position on the f$^{th}$ viewpoint image 250 of each calculated 3D coordinates, in an embodiment. The projection calculation unit 224 may utilize equation (2), the f$^{th}$ viewpoint camera projection matrix 282, and the calculated 3D coordinates to calculate projection positions on the f$^{th}$ viewpoint image 250. For equation (2), the notation z denotes the calculated 3D coordinates' depth with respect to the f$^{th}$ viewpoint image 250. Continuing, the disparity vector candidates calculation unit 226 is operable to calculate offsets between the projection positions on the f$^{th}$ viewpoint image 250 and corresponding block pair positions (based on centroid coordinates) in the f-1$^{th}$ viewpoint reconstructed image 252. These offsets represent disparity vector candidates.

The predicted disparity vector determination unit 230 of the geometry-based disparity predictor 200 is operable to determine predicted disparity vectors using the disparity vector candidates. In accordance with various embodiments, the predicted disparity vector determination unit 230 may have a disparity vector fusion unit 226. In an embodiment, the disparity vector fusion unit 226 is operable to merge disparity vector candidates of a coding block of the $f^{th}$ viewpoint image 250, which is the image being encoded.

Continuing with FIG. 2A, the encoding environment 290A may include a refined disparity vector determination unit 240 and an encoding unit 270, in accordance with various embodiments. The refined disparity vector determination unit 240 is operable to calculate refined disparity vectors based on the predicted disparity vectors 245, in an embodiment. The predicted disparity vectors 245 are not optimal disparity vectors from a coding efficiency perspective due to several factors, such as calibration noise, geometric estimation noise, and varying lighting conditions. Also the refined disparity vector determination unit 240 calculates disparity vector residuals 260 based on the refined disparity vectors and the predicted disparity vectors 245. Further, the encoding unit 270 encodes the disparity vector residuals 260 for the $f^{th}$ viewpoint image 250, which is the image being encoded.

Now referring to FIG. 2B, a block diagram of a geometry-based disparity predictor 200 in a decoding environment 290B is illustrated, in accordance with various embodiments. The discussion of the geometry-based disparity predictor 200 of FIG. 2A is equally applicable to the geometry-based disparity predictor 200 of FIG. 2B, except as noted below. The same reference numerals are used in FIGS. 2A and 2B to refer to corresponding components. In an embodiment, the decoding environment 290B may include a decoding unit 290 and a refined disparity vector determination unit 240. The $f^{th}$ viewpoint image 250 (FIG. 2A), which was encoded in accordance with the description of FIG. 2A, is now being decoded in FIG. 2B.

The decoding unit 290 is operable to decode disparity vector residuals 260 for the $f^{th}$ viewpoint image 250 (FIG. 2A), which is the image being decoded, in an embodiment. Further, in an embodiment, the refined disparity vector determination unit 240 is operable to calculate refined disparity vectors 275 based on the predicted disparity vectors 245 (determined as discussed with respect to FIG. 2A) and the disparity vector residuals 260. In accordance with various embodiments, the refined disparity vectors 275 are involved in decoding the $f^{th}$ viewpoint image 250 (FIG. 2A).

Multiview Coding Techniques Using Geometry-Based Disparity Prediction

The following discussion sets forth in detail the operation of geometry-based disparity prediction. With reference to FIGS. 5 and 7-10, flowcharts 500, 700, 800, 900, and 1000 each illustrate example steps used by various embodiments of geometry-based disparity prediction. Moreover, FIGS. 5 and 7-10 will make reference to FIG. 6. Flowcharts 500, 700, 800, 900, and 1000 include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. Although specific steps are disclosed in flowcharts 500, 700, 800, 900, and 1000, such steps are examples. That is, embodiments are well suited to performing various other steps or variations of the steps recited in flowcharts 500, 700, 800, 900, and 1000. It is appreciated that the steps in flowcharts 500, 700, 800, 900, and 1000 may be performed in an order different than presented, and that not all of the steps in flowcharts 500, 700, 800, 900, and 1000 may be performed.

Figure 5:
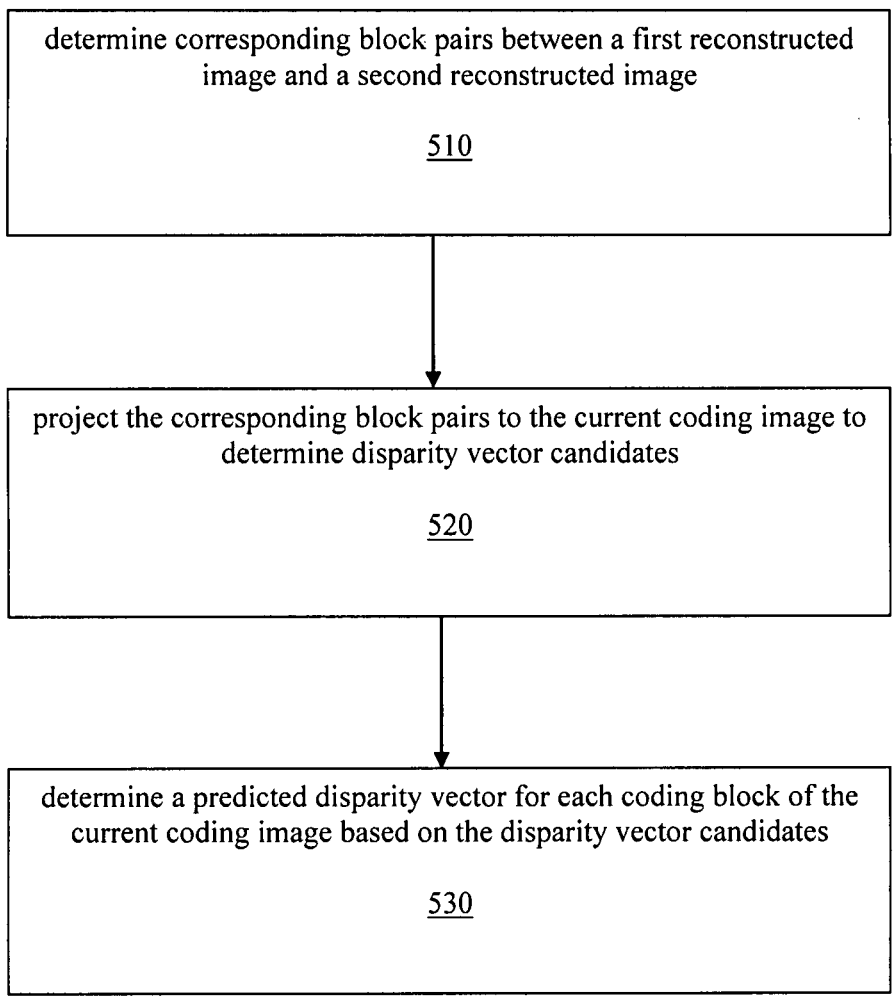
FIG. 5 illustrates a flowchart for geometry-based disparity prediction in multiview coding, in accordance with various embodiments.
Figure 6:
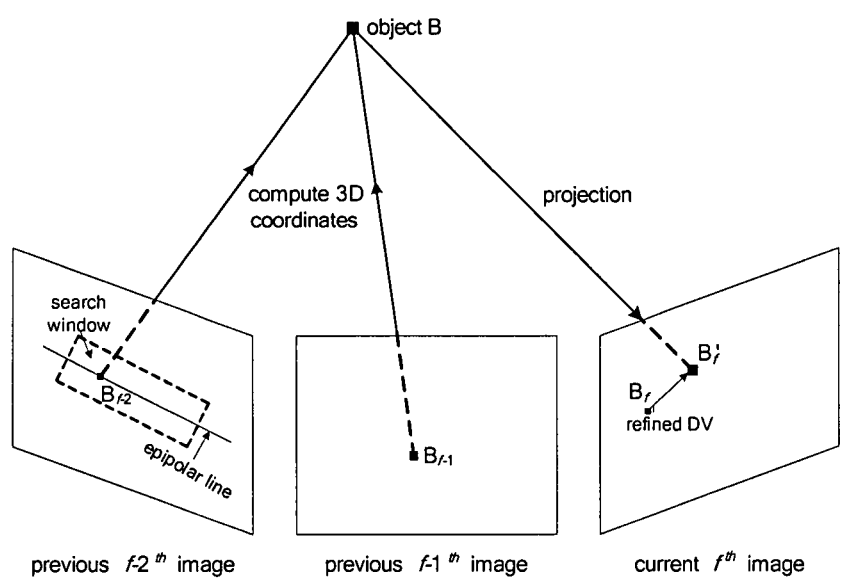
FIG. 6 illustrates geometric relations utilized by geometry-based disparity prediction, in accordance with various embodiments.

FIG. 5 illustrates a flowchart 500 for geometry-based disparity prediction in multiview coding, in accordance with various embodiments. Moreover, FIG. 6 illustrates geometric relations utilized by geometry-based disparity prediction in flowcharts 500, 700, 800, 900, and 1000, in accordance with various embodiments. As depicted in FIG. 6, the $f^{th}$ viewpoint image is the image being coded (e.g., encoded or decoded). In an embodiment, geometry-based disparity prediction generates the predicted disparity vector(s) for the $f^{th}$ viewpoint image (e.g., video image and still image) based on a $f-1^{th}$ viewpoint image and a $f-2^{th}$ viewpoint image. Moreover, the $f-1^{th}$ viewpoint image and the $f-2^{th}$ viewpoint image have already undergone processing and coding. Thus, the $f-1^{th}$ viewpoint image and the $f-2^{th}$ viewpoint image are reconstructed before being used by geometry-based disparity prediction. Further, the $f^{th}$ viewpoint image, $f-1^{th}$ viewpoint reconstructed image, and $f-2^{th}$ viewpoint reconstructed image represent different images of a scene at a certain time. The scene is a scene in real world 3D space.

Returning to FIG. 5, for $f^{th}$ viewpoint image (coding image), corresponding block pairs between $f-1^{th}$ viewpoint reconstructed image (first recon. image) and $f-2^{th}$ viewpoint reconstructed image (second recon. image) are determined (block 510). Further, the corresponding block pairs are projected to the $f^{th}$ viewpoint image to determine disparity vector candidates (block 520). A predicted disparity vector is determined for each coding block of the $f^{th}$ viewpoint image based on the disparity vector candidates (block 530). Each step of flowchart 500 will be discussed in detail below.

Figure 7:
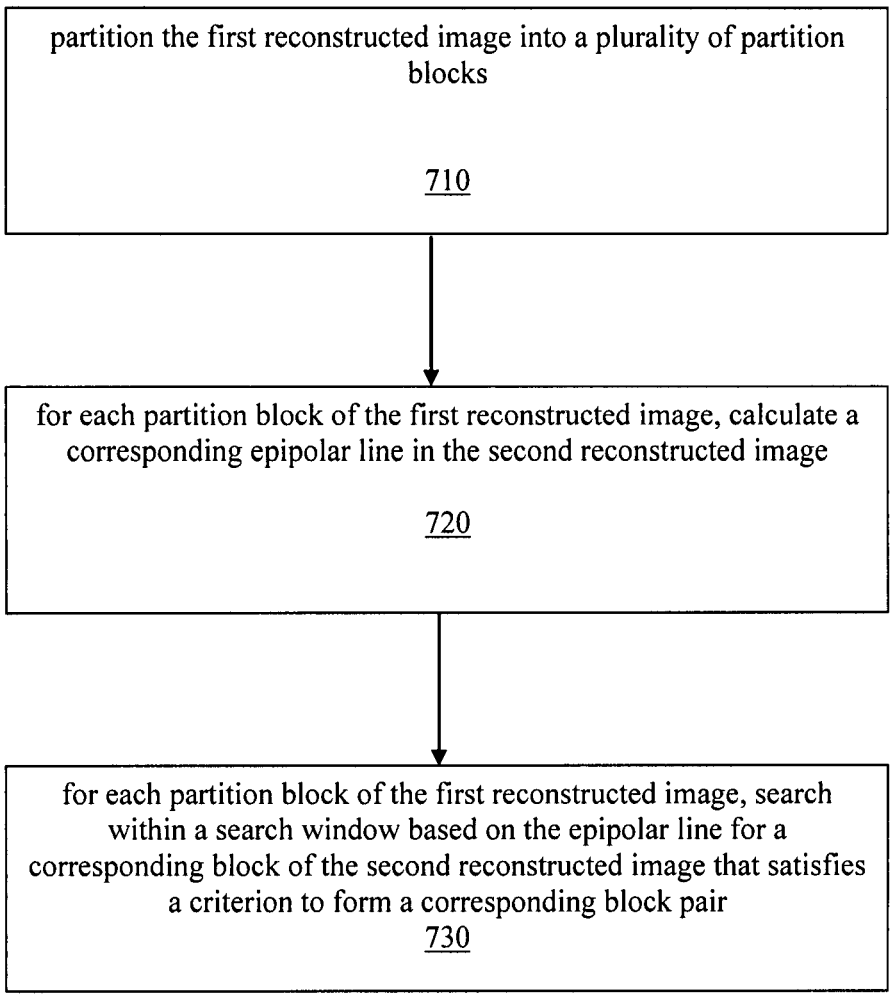
FIG. 7 illustrates a flowchart for determining corresponding block pairs, in accordance with various embodiments.

FIG. 7 illustrates a flowchart 700 for determining corresponding block pairs, in accordance with an embodiment. With reference to FIGS. 6 and 7, a block of $f-1^{th}$ viewpoint reconstructed image corresponds to a block of $f-2^{th}$ viewpoint reconstructed image if each block provides an image of the same portion of a scene from different views. These blocks are referred to as corresponding block pairs. In an embodiment, each block of corresponding block pairs is identified by its centroid coordinates. To find the corresponding block pairs, at least two images (e.g., $f-1^{th}$ viewpoint reconstructed image and $f-2^{th}$ viewpoint reconstructed image) representing the same scene from different viewpoints at a point in time and having already undergone processing and coding are selected, in an embodiment. The search for corresponding block pairs is carried out upon reconstructed images. This is done because the search for corresponding block pairs is repeated at the decoder environment and because reconstructed images are available at both the encoder and decoder environments.

In an embodiment, any two images (from multiview video/image and representing the same scene from different viewpoints at a point in time) that have already undergone processing and coding may be selected. In an embodiment, the two nearest neighboring images (e.g., $f-1^{th}$ viewpoint reconstructed image and $f-2^{th}$ viewpoint reconstructed image) are selected to improve accuracy of the search for corresponding block pairs. These two selected images (e.g., $f-1^{th}$ viewpoint reconstructed image and $f-2^{th}$ viewpoint reconstructed image) are less influenced by occlusion and thus provide predicted disparity vectors having greater accuracy.

Focusing on FIG. 7, the $f-1^{th}$ viewpoint reconstructed image is partitioned into a plurality of partition blocks (block 710). In an embodiment, the partition blocks are rectangular blocks. For example, FIG. 6 shows, in the $f-1^{th}$ viewpoint reconstructed image, a partition block $B_{f-1}(x_{f-1}, y_{f-1})$ with coordinates $(x_{f-1}, y_{f-1})$. In an embodiment, the coordinates $(x_{f-1}, y_{f-1})$ are centroid coordinates of the partition block.

Continuing with FIG. 7 at block 720, for each partition block of the f–1$^{th}$ viewpoint reconstructed image, a corresponding epipolar line is calculated in the f–2$^{th}$ viewpoint reconstructed image. In an embodiment, a partition block's epipolar line is calculated using equation (1) discussed above. With equation (1), the fundamental matrix F, and the centroid coordinates of the partition block $B_{f-1}(x_{f-1}, y_{f-1})$, the epipolar line (FIG. 6) in the f–2$^{th}$ viewpoint reconstructed image may be computed.

At block 730, for each partition block of the f–1$^{th}$ viewpoint reconstructed image, a search is performed within a search window (FIG. 6) based on the epipolar line (FIG. 6) for a corresponding block of the f–2$^{th}$ viewpoint reconstructed image that satisfies a criterion to form a corresponding block pair, in an embodiment. Searching along the epipolar line (FIG. 6) reduces the block mismatching probability. In an embodiment, the criterion is a minimal mean-squared-error (MSE) criterion between the blocks. In an embodiment, a full search (including the search window (FIG. 6)) is performed on the f–2$^{th}$ viewpoint reconstructed image. FIG. 6 shows the corresponding block $B_{f-2}(x_{f-1}+\Delta x_{f-2}, y_{f-1}+\Delta y_{f-2})$ in f–2$^{th}$ viewpoint reconstructed image of partition block $B_{f-2}(x_{f-1}, y_{f-1})$, where $(\Delta x_{f-2}, \Delta y_{f-2})$ denotes the block offset from $(x_{f-1}, y_{f-1})$. Thus, $B_{f-1}(x_{f-1}, y_{f-1})$ and $B_{f-2}(x_{f-1}+\Delta x_{f-2}, y_{f-1}+\Delta y_{f-2})$ are a corresponding block pair.

FIG. 8 illustrates a flowchart 800 for projecting corresponding block pairs to the f$^{th}$ viewpoint image (coding image) to determine disparity vector candidates, in accordance with an embodiment. For each corresponding block pair, 3D coordinates in the scene (real world 3D space) are calculated (block 810). Using equations (5) and (6), the camera projection matrices $M_{f-2}$ and $M_{f-1}$ (e.g., f–1$^{th}$ viewpoint camera projection matrix and f–2$^{th}$ viewpoint camera projection matrix), and the blocks' coordinates $(x_{f-1}+\Delta x_{f-2}, y_{f-1}+\Delta y_{f-2})$ and $(x_{f-1}, y_{f-1})$, the corresponding 3D coordinates may be computed by a least-square method, in an embodiment.

At block 820, for each corresponding block pair, a projection position on the f$^{th}$ viewpoint image of the calculated 3D coordinates is calculated. Using equation (2), the camera projection matrix $M_f$ (e.g., f$^{th}$ viewpoint camera projection matrix), and the calculated 3D coordinates, the projection position on the f$^{th}$ viewpoint image may be calculated, in an embodiment. FIG. 6 shows the projection position of corresponding block pair $B_{f-1}(x_{f-1}, y_{f-1})$ and $B_{f-2}(x_{f-1}+\Delta x_{f-2}, y_{f-1}+\Delta y_{f-2})$ is $B'_f$.

Continuing at block 830 of FIG. 8, for each corresponding block pair, an offset is calculated between the projection position on the f$^{th}$ viewpoint image and a corresponding block pair position in the f–1$^{th}$ viewpoint reconstructed image. This offset represents a disparity vector candidate. In an embodiment, the offset between the corresponding block pair's position in the f–1$^{th}$ viewpoint reconstructed image and the projection position in f$^{th}$ viewpoint image may be calculated with equation (7) as follows:

$$v_f(x_{f-1}, y_{f-1}) = (x_f(B_{f-1}) - x_{f-1}, y_f(B_{f-1}) - y_{f-1}), \qquad (7)$$

The notations $x_f(B_{f-1})$ and $y_f(B_{f-1})$ denote the projected coordinates of the partition block $B_{f-1}(x_{f-1}, y_{f-1})$ of the f–1$^{th}$ viewpoint reconstructed image in the f$^{th}$ viewpoint image.

Figure 9:
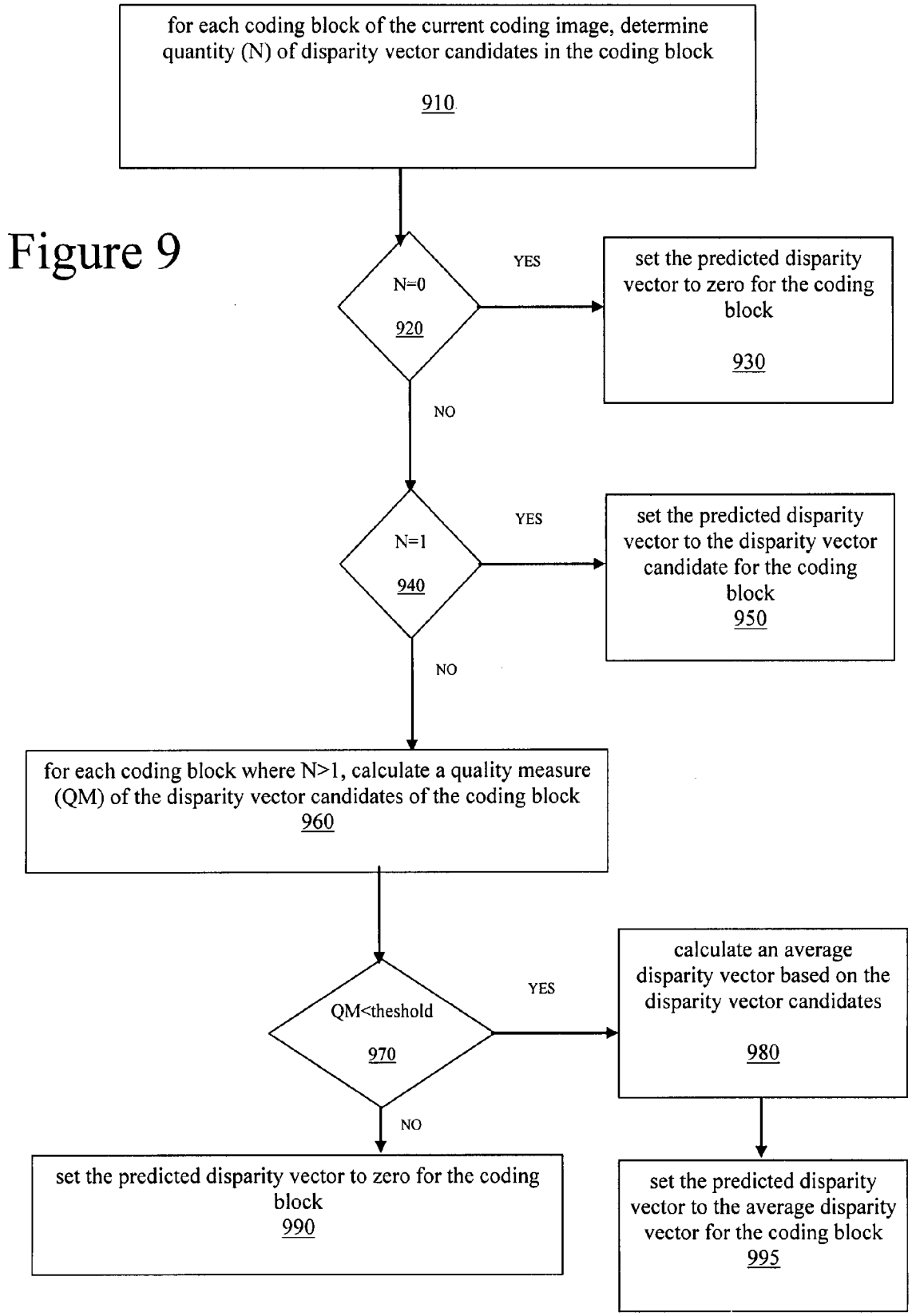
FIG. 9 illustrates a flowchart for determining a predicted disparity vector for each coding block of the coding image, in accordance with various embodiments.

FIG. 9 illustrates a flowchart 900 for determining a predicted disparity vector for each coding block of the f$^{th}$ viewpoint image (coding image), in accordance with an embodiment. A coding block represents an image portion being coded. For each coding block, the predicted disparity vector $\tilde{V}_f(i,j)$ is based on the disparity vector candidates in the coding block. In an embodiment, fusion utilized to merge similar disparity vector candidates into one predicted disparity vector $\tilde{V}_f(i,j)$. In one embodiment, the predicted disparity vector $\tilde{V}_f(i,j)$ is calculated according to the quantity N of disparity vector candidates located in a coding block.

For each coding block of the f$^{th}$ viewpoint image, the quantity (N) of disparity vector candidates in the coding block is determined (block 910).

If N=0, the predicted disparity vector $\tilde{V}_f(i,j)$ is set to zero for the coding block (blocks 920 and 930). This indicates the predicted disparity vector $\tilde{V}_f(i,j)$ for the coding block is unpredictable.

If N=1, the predicted disparity vector $\tilde{V}_f(i,j)$ is set to disparity vector candidate for the coding block (blocks 940 and 950).

If N>1, a quality measure (QM) of the disparity vector candidates of the coding block is calculated for each coding block (block 960). In an embodiment, the quality measure (QM) performed on the disparity vector candidates is calculated with equation (8):

$$\frac{1}{n-1} \sum_{i=1}^{n} \sum_{j=1, j \neq i}^{n} (|x_i - x_j| + |y_i - y_j|) < Thres_{DV}. \qquad (8)$$

The notation $(x_1, y_1)$ denotes the coordinates of the i$^{th}$ disparity vector candidate. Also, the notation $Thres_{DV}$ denotes a threshold. The threshold may be fixed. In an embodiment, $Thres_{DV}$ equals 4.0. Other values are possible.

If QM<$Thres_{DV}$, an average disparity vector based on the disparity vector candidates is calculated (block 970 and 980). The predicted disparity vector $\tilde{V}_f(i,j)$ is set to the average disparity vector for the coding block (block 995).

If QM≥$Thres_{DV}$, the predicted disparity vector $\tilde{V}_f(i,j)$ is set to zero for the coding block (blocks 970 and 990). This indicates the predicted disparity vector $\tilde{V}_f(i,j)$ for the coding block is unpredictable.

Figure 10:
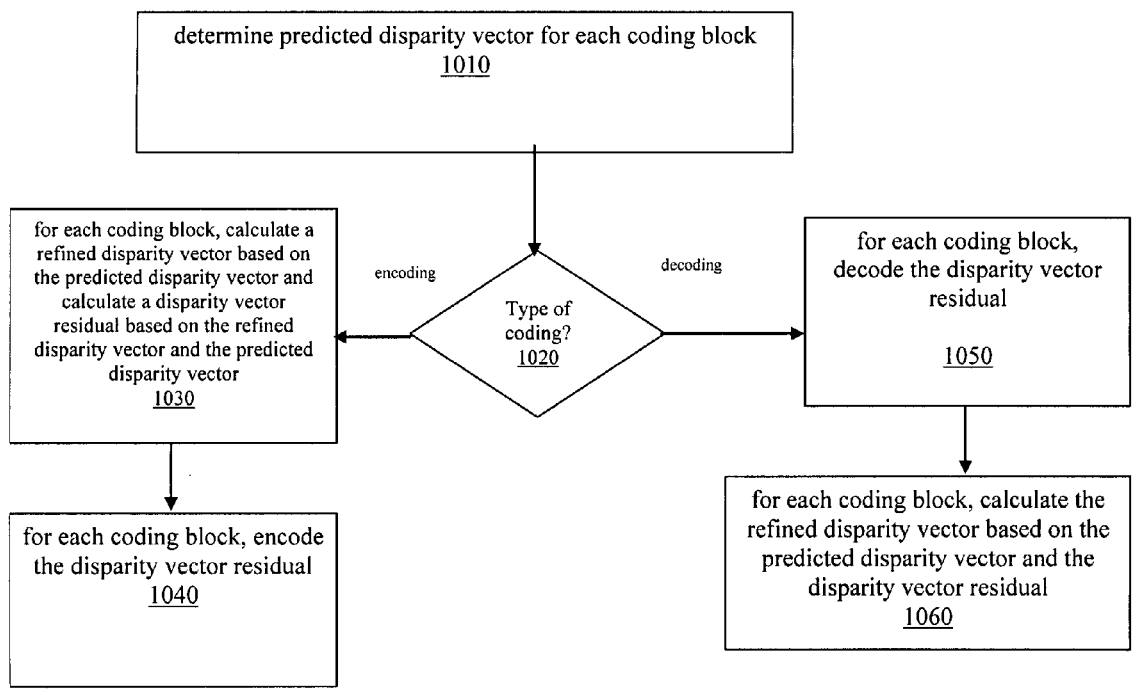
FIG. 10 illustrates a flowchart for calculating refined disparity vectors, in accordance with various embodiments.

FIG. 10 illustrates a flowchart 1000 for calculating refined disparity vectors, in accordance with an embodiment. In an embodiment, the calculation of a refined disparity vector involves a refinement process performed in a square area centered at the corresponding predicted disparity vector $\tilde{V}_f(i,j)$. In an embodiment, sub-pixel accuracy compensation may be performed. The refinement process is performed because the predicted disparity vector $\tilde{V}_f(i,j)$ is usually not the optimal disparity vector from a coding efficiency perspective due to factors such as calibration noise, geometric estimation noise, and varying lighting conditions. This refinement process is similar to the conventional motion estimation in which the median predicted motion vector MV is often used as the search starting point (or center of the search area).

At block 1010, the predicted disparity vector $\tilde{V}_f(i,j)$ for each coding block is determined, as discussed in detail above.

If encoding is being performed, a refined disparity vector based on the predicted disparity vector $\tilde{V}_f(i,j)$ is calculated for each coding block (blocks 1020 and 1030). Moreover, a disparity vector residual based on the refined disparity vector and the predicted disparity vector $\tilde{V}_f(i,j)$ is calculated (blocks 1020 and 1030). Further, the disparity vector residual is encoded for each coding block (block 1040).

If decoding is being performed, the disparity vector residual is decoded for each coding block (blocks 1020 and 1050). Further, a refined disparity vector based on the predicted disparity vector $\tilde{V}_f(i,j)$ and the disparity vector residual is calculated for each coding block (block 1060).

Referring again to FIG. 6, block $B_f$ represents the real corresponding block of block $B_{f-1}$ in the $f^{th}$ viewpoint image. Moreover, the refined disparity vector (DV) is shown in FIG. 6.

Figure 11:
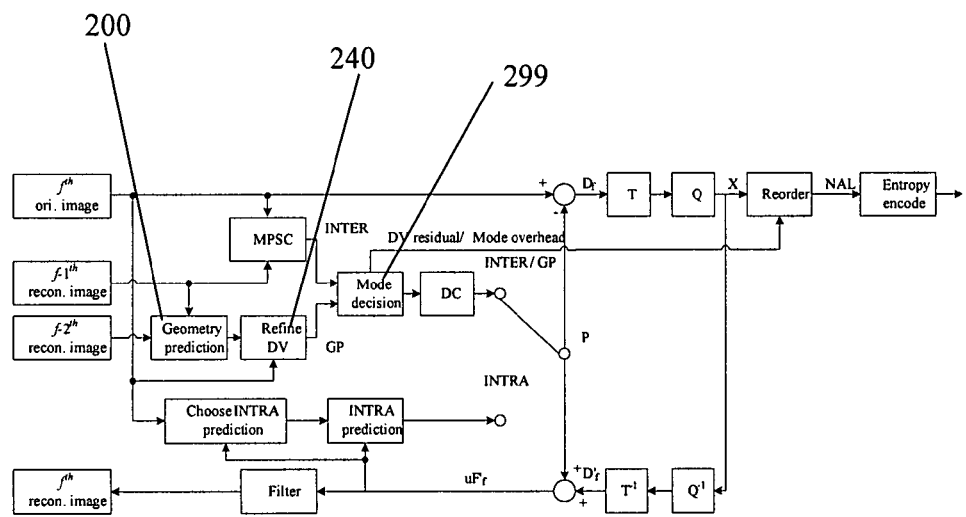
FIG. 11 illustrates a block diagram of an implementation of a geometry-based disparity predictor in an encoder environment compatible with the H.264/AVC specification, in accordance with various embodiments.

FIG. 11 illustrates a block diagram of an implementation of a geometry-based disparity predictor 200 in an encoder environment 1100 compatible with the H.264/AVC specification, in accordance with various embodiments. It is possible to use other coding specifications.

As depicted in FIG. 11, the encoder environment 1100 includes a geometry-based disparity predictor 200, a refined disparity vector determination unit 240, a mode decision unit 299, and components for executing an encoding scheme compatible with the H.264/AVC specification, in an embodiment. The encoder environment 1100 may operate in any of a plurality of coding modes, in an embodiment. The geometry-based disparity predictor 200 and the refined disparity vector determination unit 240 operate as described in detail with respect to FIG. 2A, in an embodiment. The mode decision unit 299 is operable to select a coding mode from the coding modes for operation of the encoder environment 1100, in an embodiment.

In an embodiment, the coding modes include a GP (geometric prediction) mode. In an embodiment, the coding modes also include INTER mode and INTRA mode. The INTER mode and INTRA mode are based on the H.264/AVC specification. In the GP mode, the geometry-based disparity predictor 200 and the refined disparity vector determination unit 240 are active and operate as described in detail with respect to FIG. 2A, in an embodiment.

In an embodiment, the first image is encoded as an I-frame using the INTRA mode. The second image is encoded as a P-frame using both the INTER and INTRA modes. Starting from the third image, all the three modes may be used. In an embodiment, the mode decision unit 299 decides the optimal coding mode that provides the best compression. After this decision, a one-bit overhead is generated for each coding block to signal whether the GP mode is used if the coding block is not coded in the INTRA mode. In the GP mode, disparity compensation (use geometry-based disparity predictor 200) is then performed to generate disparity vector residual signals for encoding.

Figure 12:
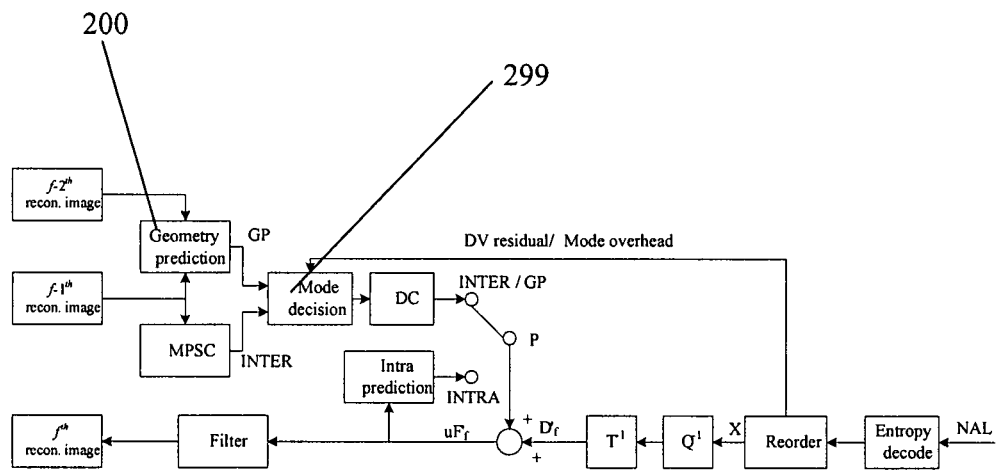
FIG. 12 illustrates a block diagram of an implementation of a geometry-based disparity predictor in a decoder environment compatible with the H.264/AVC specification, in accordance with various embodiments.

FIG. 12 illustrates a block diagram of an implementation of a geometry-based disparity predictor 200 in a decoder environment 1200 compatible with the H.264/AVC specification, in accordance with various embodiments. It is possible to use other coding specifications. In an embodiment, the decoder environment 1200 includes a geometry-based disparity predictor 200, a mode decision unit 299, and components for executing a decoding scheme compatible with the H.264/AVC specification. The decoder environment 1200 may operate in any of a plurality of coding modes as described above with respect to the encoder environment 1200, in an embodiment. The geometry-based disparity predictor 200 operates as described in detail with respect to FIG. 2A and FIG. 2B, in an embodiment. The mode decision unit 299 is operable to select a coding mode from the coding modes for operation of the decoder environment 1200, in an embodiment.

As depicted in FIG. 12, in the GP mode the geometry-based disparity predictor 200 repeats its operation to get the same predicted disparity vector $\tilde{V}_f(i,j)$ as that at the encoder environment 1100. According to the overhead bit of each coding block, the mode decision unit 299 decides whether the GP mode is used for coding the current coding block, in an embodiment. The actual disparity vector is obtained by adding a residual vector onto the predicted disparity vector. In an embodiment, this predicted disparity vector may be generated by the geometry-based disparity predictor 200 or by a median predictor based on the H.264/AVC specification, depending on the coding mode. Then, after the disparity compensation, the image may be reconstructed at the decoder environment 1200.

Geometry-based disparity prediction reduces the number of encoded bits. As a result, greater compression of multiview data is achieved. Further, there are reductions in memory storage requirements for the multiview data and reductions in bandwidth requirements for transmitting the multiview data, making real world applications of multiview data more feasible and practical.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method performed by at least one processing unit of a computer system, the method comprising:
    determining a corresponding block pair for a first image corresponding to a first viewpoint of a scene and a second image corresponding to a second viewpoint of the scene, wherein the first image comprises multiple first blocks and the second image comprises multiple second blocks and the corresponding block pair comprises an individual first block from the first image and an individual second block in the second image that both correspond to a particular portion of the scene;
    projecting the individual first block and the individual second block of the corresponding block pair to obtain a corresponding projection position for a third image corresponding to a third viewpoint of the scene; and
    using the corresponding projection position to determine a predicted disparity vector for an individual third block of the third image that also corresponds to the particular portion of the scene.

2. The method as recited in claim 1 wherein the determining the corresponding block pair comprises:
    partitioning the second image into the multiple second blocks;
    for the individual second block of the second image, calculating a corresponding epipolar line in the first image; and
    searching different first blocks within a search window based on the corresponding epipolar line and applying a criterion to the different first blocks within the search window to identify the individual first block.

3. The method as recited in claim 1 wherein the first image is a first reconstructed image, the second image is a second reconstructed image, and the third image is a coding image.

4. The method as recited in claim 1 wherein the projecting comprises:
    using the individual first block and the individual second block of the corresponding block pair to determine three dimensional coordinates of the portion of the scene;
    calculating the projection position on the third image of the three dimensional coordinates;
    calculating an offset between the projection position and the individual second block in the second image; and
    using the offset as the predicted disparity vector.

5. The method as recited in claim 1, further comprising:
calculating a refined disparity vector for the individual third block of the third image based on the predicted disparity vector;
calculating a disparity vector residual based on the refined disparity vector and the predicted disparity vector; and
encoding the disparity vector residual to obtain an encoded disparity vector residual for the individual third block of the third image.

6. The method as recited in claim 1 wherein the first image, the second image, and the third image comprise multiview video data.

7. The method as recited in claim 1 wherein the first image, the second image, and the third image comprise multiview image data.

8. A multiview coding apparatus comprising:
at least one computer storage media storing computer-executable instructions; and
at least one processing unit configured by the computer-executable instructions to implement:
a corresponding block pairs determination unit operable to determine corresponding block pairs from first blocks of a first image and second blocks of a second image, wherein the first image corresponds to a first viewpoint of a scene and the second image corresponds to a second viewpoint of the scene that is different than the first viewpoint;
a corresponding block pairs projection unit operable to project the corresponding block pairs to a third image to determine disparity vector candidates for third blocks of the third image, wherein the third image corresponds to a third viewpoint of the scene that is different than both the first viewpoint and the second viewpoint; and
a predicted disparity vector determination unit operable to determine predicted disparity vectors for the third blocks of the third image using the disparity vector candidates.

9. The multiview coding apparatus as recited in claim 8 wherein the corresponding block pairs determination unit comprises:
a partition unit operable to partition the first image into the first blocks and the second image into the second blocks;
an epipolar line calculation unit operable to calculate epipolar lines in the first blocks for corresponding second blocks; and
a block match search unit operable to search for block matches in the first image that satisfy a criterion with respect to the corresponding second blocks to form the corresponding block pairs.

10. The multiview coding apparatus as recited in claim 8 wherein the corresponding block pairs projection unit comprises:
a coordinates calculation unit operable to calculate coordinates in the scene for each of the corresponding block pairs;
a projection calculation unit operable to calculate projection positions of the coordinates on the third image; and
a disparity vector candidates calculation unit operable to calculate offsets between the projection positions and corresponding block pair positions in the second image, wherein the disparity vector candidates comprise the offsets.

11. The multiview coding apparatus as recited in claim 8 wherein the predicted disparity vector determination unit comprises:
a disparity vector fusion unit operable to merge the disparity vector candidates to obtain the predicted disparity vectors.

12. The multiview coding apparatus as recited in claim 8, wherein the at least one processing unit is further configured by the computer-executable instructions to implement:
a refined disparity vector determination unit operable to:
calculate refined disparity vectors based on the predicted disparity vectors, and
calculate disparity vector residuals based on the refined disparity vectors and the predicted disparity vectors; and
an encoding unit operable to encode the disparity vector residuals for the third image.

13. The multiview coding apparatus as recited in claim 8, wherein the at least one processing unit is further configured by the computer-executable instructions to implement:
a decoding unit operable to decode disparity vector residuals for the third image; and
a refined disparity vector determination unit operable to calculate refined disparity vectors based on the predicted disparity vectors and the disparity vector residuals.

14. The multiview coding apparatus as recited in claim 8 wherein the first image, the second image, and the third image are multiview video data or multiview image data.

15. A system comprising:
at least one processing unit; and
at least one computer storage media storing instructions which, when executed by the at least one processing unit, cause the at least one processing unit to:
determine a corresponding block pair for a first image corresponding to a first viewpoint of a scene and a second image corresponding to a second viewpoint of the scene, wherein the first image comprises multiple first blocks and the second image comprises multiple second blocks and the corresponding block pair comprises an individual first block from the first image and an individual second block in the second image;
project the individual first block and the individual second block of the corresponding block pair to obtain a corresponding projection position for a third image corresponding to a third viewpoint of the scene; and
use the corresponding projection position to determine a predicted disparity vector for an individual third block of the third image.

16. The system of claim 15, wherein the instructions cause the at least one processing unit to obtain the corresponding projection position in the third image by:
calculating coordinates of the corresponding block pair in the scene; and
determining the corresponding projection position using the coordinates.

17. The system of claim 16, wherein the instructions cause the at least one processing unit to determine the predicted disparity vector by:
determining an offset between the corresponding projection position in the third image and a corresponding block position of the individual second block in the second image.

18. The system of claim 17, wherein the instructions cause the at least one processing unit to:
determine the predicted disparity vector by using the offset as the predicted disparity vector.

19. The system of claim 17, wherein the instructions cause the at least one processing unit to:
determine the predicted disparity vector by averaging the offset and at least one other offset of another corresponding projection position and another corresponding block position from another corresponding block pair.

20. The system of claim 15, wherein the first viewpoint and the second viewpoint are neighboring viewpoints.

* * * * *